United States Patent Office 3,700,628

Patented Oct. 24, 1972

3,700,628

BODY IMPLANTABLE ENCAPSULANT AND METHOD OF PREPARATION

William J. Dermody, Washington Crossing, N.J., and Alan E. Varker, Philadelphia, Pa., assignors to ESB Incorporated No Drawing. Filed Feb. 8, 1971, Ser. No. 113,619
Int. Cl. A61n *1/36*
U.S. Cl. 260—47 EN 10 Claims

ABSTRACT OF THE DISCLOSURE

A process is provided for encapsulating devices that may be implanted in the body without causing unfavorable reactions in and rejection by the body. An example of a device which may be encapsulated by the process is a heart pacer.

The process includes purification of the epoxy resin, preparation of an amine-epoxy hardener, and controlling the curing conditions of the mixture of hardener and resin.

BACKGROUND OF THE INVENTION

This invention relates to devices which are inserted in the body and implanted therein for significant periods of time—sometimes permanently. More particularly, this invention relates to pulse generating devices, such as battery powered electronic organ stimulation devices like cardiac pacers for controlling the rate of the heartbeat. The invention also relates to stimulators for the brain, bladder and other organs as well.

Epoxy resins as a class of compounds are particularly useful as embedding systems for electrical components and have been used in the embedment of these devices implanted in the body. However, implantation of cured standard epoxy resins can initiate unfavorable reactions in the body, necessitating coating the cured epoxy with a substance that is impermeable to the soluble impurities in the cured epoxy resin, compatible with the body systems, and is not readily rejected by the body. The coatings are generally not structural in character.

Epoxy resins are typically prepared by the reaction of epichlorohydrin with a polyhydric phenol and sodium hydroxide. Most of the epoxy resins are made from a dihydric phenol. United States Patent No. 2,840,541, Process for Manufacture of Glycidyl Ethers of Polyhydric Phenols, June 24, 1958 to P. Pezzaglia describes a process for the manufacture of the diglycidyl ether of the dihydric phenol. The process described utilizes an excess of epichlorohydrin over the stoichiometric proportion of about two moles of epichlorohydrin per mole of the phenol, with the addition of an equivalent of sodium hydroxide per equivalent of epichlorohydrin that combines with the dihydric phenol. Pezzaglia further describes a continuous process for the preparation of a purer diglycidyl ether. However, even with the improvement described, Pezzaglia indicates that a significant portion of higher molecular weight fractions is in the product. A typical commercial purified grade resin has an epoxide equivalent of 172 to 178 and a viscosity at 23° C. of 4000 to 6400. A purification of 2,2-bis(2,3-epoxy propoxyphenyl) propane is described in U.S. Patent No. 3,093,661, Production of High Purity Diepoxide, June 11, 1963 to Robert W. Fourie et al. This compound is produced by the reaction of epichlorohydrin with 2,2-bis(4-hydroxyphenyl) propane, the phenolic compound being referred to in the industry and hereinafter as "bisphenol A." The purification procedure described by this patent involves the addition of monoglycidyl ethers such as n-butyl monoglycidyl ether. The purified epoxy resin is allowed to crystallize at reduced temperatures.

The object of this invention is to provide a method for preparing a body compatible implantable encapsulant material. A more specific object in preparing this body implantable encapsulant is that it provide electric insulation between the electrical components encapsulated and between the body and the electrical components as well as isolation of the device encapsulated from the environmental effects of the body fluids and reactions. A further object is to prevent emission from the encapsulated device and to avoid emission from the encapsulant itself of substances that will not be compatible with surrounding tissue. In addition, it is desirable that the encapsulant resist gradual deterioration to the point where the device becomes inoperative. A specific object is to encapsulate a device in a manner so that it may be safely implanted in the body for a period of ten years or more.

An object of the present invention is to provide a room temperature cured encapsulant material that is hard, clear, essentially colorless, chemically resistant to body fluids and resistant to deterioration by heat or chemical sterilization procedures. A further object is to provide an encapsulated organ stimulator suitable for implantation in a body so that the electrical contact leads are sealed around the attachment to the electronic circuitry of the main body of the stimulator so that body fluids do not enter the circuitry along the interface between the electrical contact leads and the encapsulant.

SUMMARY OF THE INVENTION

The present invention has accomplished the foregoing objects and initial results indicate that the method provides an encapsulant which will provide protection without side effects for extended periods of time. The method of this invention for preparing a body compatible, implantable encapsulant comprises the use of a particular purified epoxy resin, that is the reaction product of a 2,2-bis(4-hydroxyphenyl) propane and epichlorohydrin, hereinafter referred to as the diglycidyl ether of bisphenol A or "DGEBA" or "purified DGEBA" with an epoxy equivalent that approaches as closely as possible about 170 and a viscosity of about 5,000 to about 5,500 centipoise at 23° C. This resin is prepared by diluting commercial grade or crude resin with about 8 to about 10 percent by weight n-butyl glycidyl ether on the total weight of the mix. The solution is then cooled and maintained at a temperature less than about 10° C. until crystallization takes place. Generally, the crystallization is allowed to continue until a major proportion and generally about 75 to about 90% DGEBA is crystallized. The n-butyl glycidyl ether is then removed, generally by vacuum filtration.

In a separate container, diethylene triamine, hereinafter referred to as "DETA," of at least 97.5 percent purity is maintained in a nitrogen atmosphere. The DETA is preferably warmed to a temperature of less than about 75° C. while a charge of purified DGEBA previously warmed to a temperature of about 45 to 75° C. is added gradually in quantities of about equal parts by weight of the DGEBA to the DETA. The mixture warms rapidly due to the heat of reaction and is maintained at a temperature below 95° C. until essentially all of epoxy functionality is reacted with amine functionality to produce an amine hardener. For small total reactant quantities an initial reaction temperature of about 75° C. with cooling to keep the peak exotherm temperature less than about 95° C. is effective.

On a mole basis, the amount of amine functionality is in substantial excess such that substantially all of the epoxy functionality disappears. The hardener mixture is cooled to a temperature range of 20 to 30° C. at which temperature it is quite stable. When the encapsulant is ready for use, about one part of the hardener mixture is added to about four parts by weight of additional purified epoxy resin above, the mixing being carried out in nitrogen atmosphere. Initially, the mixture is hazy and appears incompatible. On further mixing, the mixture gradually clears and becomes transparent. This mixture is then placed in a means for controlling the shape of the encapsulant around the device to be encapsulated. This means is preferably a metal mold although plastic molds and other means may be utilized. During this entire handling procedure, the encapsulant mixture and device are maintained at a temperature of 20 to 30° C. in a nitrogen atmosphere. The mixture of the epoxy resin and hardener spontaneously cures in an ambient temperature range of 20 to 30° C. Means are provided for cooling the mixture during the polymerization and cure such that the temperature of the encapsulant is not allowed to reach a temperature above about 50° C. The polymerized encapsulant is allowed to reach essentially full cure before removal from the temperature controlled nitrogen atmosphere. The cured encapsulant is body compatible when placed in a test mammal's body.

DESCRIPTION OF THE PREFERRED EMBODIMENTS

In order to attain the objects of this invention, all of the basic steps described hereinabove must be performed and if any are omitted, the quality of the product is compromised.

One of the objects of the present invention is to prepare an encapsulant which is body implantable. The implant may be made by any suitable means, however, surgical implantation is the most general and most useful technique. In particular, the encapsulant is effective for protecting any device to be implanted such as monitors, pacers and the like. Of particular importance are heart pacers.

The particular epoxy resins useful in this invention have an epoxy equivalent that approaches 170. The epoxy equivalent is the weight of resin in grams which contains one gram equivalent of epoxy functionality. The epoxy equivalent may be determined by chemical analysis. The method may utilize an addition of hydrogen halide with the difference between the amount of acid added and the amount left unconsumed determined by titration with a standard base. The purification process of this invention essentially eliminates any higher molecular weight resins so that the epoxy equivalents greater than 170 are not obtained. A combination of small quantities of lower molecular fractions and experimental error causes experimental values to range as low as 168; preferably the range is 169 to 170.

The viscosity of the purified DGEBA is preferably about 5200 centipoise and experimental values on the super cooled liquid range from about 5100 to about 5300 as measured on a Brookfield viscometer at 23° C. The choice of different spindles and rotation speeds may cause the values obtained to range from about 5000 to about 5500 centipoise.

The crystallization of the epoxy resin from solution in n-butyl monoglycidyl ether may take as long as three days to attain a high yield. The temperature is not critical as long as it is below about 10° C. Seeding accelerates initial crystallization. The purification of the epoxy resin accomplishes removal of higher molecular weight fractions soluble in the n-butyl monoglycidyl ether as well as lower molecular weight impurities. When the mixture is vacuum filtered, the high molecular weight fractions and other impurities remain in solution and are drawn off from the purified DGEBA.

The purity of the particular DETA used to manufacture the hardener is critical to the objects of this invention. The purity of the triamine may be determined by any known means but is most easily calculated by neutralization with a standard acid.

The temperature range of the reaction between the diethylene triamine and the DGEBA to produce the hardener is critical to the invention. At temperatures above about 95° C., dehydration of the hydroxyl groups and deamination of the reactants results in the formation of unsaturation, which imparts a yellow or brown color to the product and simultaneously results in the introduction of unsaturated sites capable of further reaction to an impure product unsatisfactory for our intended use. As the temperature is reduced below 90° C., the rate of reaction is slowed perceptibly, and temperatures below about 40° C. are useful for only the largest of bulk proportions. The large molar excess of DETA present during the preparation of the amine hardener is important in order to insure the reaction of one molecule of the triamine with each of the two glycidyl groups on the opposite ends of the DGEBA, and to have a sufficient excess of DETA present at the end of the reaction to serve as a reactive diluent to reduce the viscosity of the high molecular weight DGEBA-amine adduct to a suitable working range. Excess amine also insures against the formation of intractable crosslinked products unsuitable for use in the present invention.

The DGEBA-amine adduct molecule provides eight active amine hydrogen sites capable of reacting with epoxy resin. The uncombined DETA in the hardener mixture provides five active amine hydrogen sites per molecule. The total amine hydrogen functionality of the mixture is thus the sum of the products of the molar concentration and functionalities of both components.

The advantage of using this hardener mixture rather than unreacted amine include reduced volatility and thus reduced curative lost during mixing and curing, increased viscosity with better handling properties and reduced reactivity giving better control of the exotherm during cure.

The nitrogen atmosphere is necessary throughout each step of the invention where noted in order to eliminate unwanted reaction with oxygen, carbon dioxide or water from the atmosphere. These reactions produce contamination by inorganic salts or reactive organic species, thus lowering electrical resistance and leading to increased likelihood of sensitivity reactions when implanted in the body.

Epoxy functionality decreases to essentially zero during the preparation of the hardener. The decrease in epoxy functionality as a guide in controlling the reaction is most easily determined by infra-red analysis.

During mixing, the clarity of the mixture of the hardener and the epoxy resin changes perceptibly. When the two components are initially mixed, a translucent fluid is obtained. Upon further mixing, the haze disappears until the mass is visually clear. At this point, the mixture should be poured immediately as polymerization follows soon after with thickening and finally cure.

The means for shaping the encapsulant around the device will depend upon the shape and size of the device to be encapsulated. The composition and character of the device also affects the choice of the means. The most common technique is to place the device inside a metal mold allowing a suitable area for the encapsulant to flow around the device inside the mold. Typically, the device is held off the surface of the metal mold by guides designed to provide space for the liquid encapsulant to be poured or inserted into the mold around the device. When the mold is metal, it may be prepared from any structural metal including aluminum, steel, chrome-plated steel, and the like. The mold may also be prepared from non-metallic materials, although these are less preferred. These non-metal materials include rubber, plastic such as epoxy resins, and rubber-coated metal molds. Generally, a release agent to prevent the encapsulant from sticking to the mold is utilized. Standard release agents are useful including silicones, wax, mineral oil, soap, fluorocarbons, and the like.

The temperature of the curing encapsulant at the warmest point must be kept below 50° C. The warmest point is generally at the center of the largest volume of the encapsulant which in turn is generally where the encapsulant is thickest. This temperature ceiling is most easily maintained by utilizing a metal mold with a large heat sink. This heat sink may be merely a large metal volume designed such that heat is easily conducted away from the mold. The mold may be provided with cooling coils through which air, water, or another fluid flows to dissipate the heat generated during cure of the encapsulant. The most useful technique for controlling the temperature for relatively small masses is providing a metal mold of high mass around which a good air flow is provided to control the temperature. A heat sink provided by mass of the metal mold of at least ten times the volume of the encapsulant is effective in controlling the temperature of the encapsulant. Preferably the volume of the mold is at least 20 times the volume of the encapsulant.

After the epoxy resin and hardener are mixed, it is generally desirable to degas the resin to remove any dissolved gas.

The encapsulant is allowed to cure in a heat sink mold in a nitrogen atmosphere until essentially full cure is attained. The degree of cure is most easily determined by periodic checks on the hardness of the encapsulant material during cure. The encapsulant generally attains a Durometer D hardness of about 80 to 85.

In order to reduce the viscosity of the hardener preparation mix it is sometimes desirable to add up to about 15% of a lower alkyl glycidyl ether to the DGEBA before reaction with the amine. A particularly effective mix is ten parts n-butyl glycidyl ether and 90 parts of DGEBA. This mix is reacted with 100 parts of DETA to form the hardener.

The following examples are provided as a means for illustrating the invention and are in no way meant to limit the scope of the invention. Parts and percentages are by weight unless otherwise noted.

Example 1

An epoxy resin is prepared by the reaction of bisphenol A with a large excess of epichlorohydrin in the presence of sodium hydroxide, distilling out the unreacted epichlorohydrin and extracting the product by solution in toluene followed by subsequent evaporation of the toluene as taught in U.S. Patent No. 2,840,541, supra. The resin is purified by dissolving 90 parts in about ten parts n-butyl glycidyl ether and allowing the pure DGEBA to crystallize for several days at temperatures less than 10° C. A free flowing crystalline product with an epoxy equivalent of 170 and viscosity of 5200 centipoise is obtained when the n-butyl glycidyl ether is removed by vacuum filtration. A charge of one hundred grams of diethylene triamine (boiling point 206–207° C.) is placed in a round bottom flask under a nitrogen atmosphere at 75° C. A melt of 100 grams of the purified diglycidyl ether of bisphenol A at 75° C. is gradually added keeping the reaction temperature between 90° and 95° C., while stirring continuously. At the completion of the reaction, the product is allowed to cool, with slow agitation, to 75° C. A charge of 12 grams diethylene triamine is added. The product is cooled to 23° C. and transferred under a nitrogen atmosphere to amber bottles with tight fitting caps. The viscosity of the hardener product ranges from 10,000 to 12,000 centipoise as measured on a Brookfield viscometer at 21.5° C. using a #1 spindle at 30 r.p.m. The amine hardener is substantially water white and is crystal clear.

One part of the amine hardener is added to four parts of the purified diglycidyl ether of bisphenol A and mixed under a nitrogen atmosphere at 20–25° C. for approximately 15 to 20 minutes until the cloudiness which appears during the early stages of mixing disappears. The mixture is degassed under a pressure of 5–10 millimeters mercury. The mixture is poured into a closed aluminum metal metal surrounding a heart pacer device to be encapsulated and is maintained at a temperature in the range of 30–35° C. for fifteen to twenty hours under a positive pressure of 15 p.s.i.g. nitrogen. The encapsulation obtained is hard, clear, almost colorless, and chemically inert. Initial tests indicate that the encapsulant is suitable for implantation in living tissue for protracted periods of time without damage to the organism or the device encapsulated.

Example 2

DGEBA, as prepared in Example 1, is diluted with 10 percent by weight of a lower aliphatic glycidyl ether such as n-butyl glycidyl ether. The solution is used to prepare the amine hardener adduct in the manner described in Example 1. The amine hardener adduct obtained has a Brookfield viscosity of about 5,000 centipoise at 21.5° C., is nearly water white, and sparkling clear.

Using the procedure of Example 1, an encapsulant is prepared by mixing one part of this amine hardener adduct with four parts of additional DGEBA. During the handling of the epoxy resin, the hardener mixture is of lower viscosity than obtained with Example 1. In addition, the DGEBA is added as a super cooled liquid. The liquid character is obtained by heating the DGEBA to a temperature greater than 45° C. until all of the crystals disappear. The liquid is then cooled to the temperature range of 20 to 30° C. when it is added to the hardener. The liquid character of the DGEBA facilitates mixing with the hardener and may be molded in an enclosed mold under nitrogen pressure to obtain a hard, clear, essentially colorless, chemically inert mass surrounding the electrical components.

While we have described our invention with reference to certain preferred embodiments, it is appreciated that numerous variations will readily occur to those having ordinary skill in the art. It is accordingly intended that the scope of our invention be determined with reference to the following claims.

We claim:

1. A method for preparing a body compatible, implantable encapsulant comprising (a) preparing a solution of about 88 to about 90 percent by weight diglycidyl ether of 2,2-bis(4-hydroxy phenyl) propane of commercial grade purity and about 12 to about 10 percent by weight n-butyl glycidyl ether, (b) maintaining the solution at a temperature less than about 10° C. until crystallization of the diglycidyl ether of 2,2-bis(4, hydroxy phenyl) propane has taken place, (c) removing essentially all of the n-butyl glycidyl ether containing impurities to produce (A) purfiied diglycidyl ether of 2,2-bis (4-hydroxy phenyl) propane, having an epoxy equivalent of about 170 and a viscosity of about 5,000 to about 5,500 centipose at 23° C.

(d) maintaining a charge of diethylene triamine of at least 97.5 percent purity in a nitrogen atmosphere while (e) adding gradually, about one part by weight of (A) to one part by weight of the diethylene triamine, (f) maintaining the mixture of (A) and diethylene triamine at a temperature less than about 95° C. until essentially all of the epoxy functionality is reacted with amine functionality to produce an amine hardener (B), (g) cooling the hardener (B) to a temperature range of 20 to 30° C., (h) mixing about four parts by weight of (A) and one part of (B) in a nitrogen atmosphere until the mixture becomes visually clear, (i) placing the mixture of step (h) in means for controlling the shape of the cured encapsulant desired at 20–30° C. in a nitrogen atmosphere, (j) providing means for cooling the mixture of step (h) during cure to maintain the temperature below 50° C. in the thickest section of the encapsulant, (k) removing the cured mixture of step (j) after essentially full cure has been attained to produce a body compatible encapsulant.

2. The method of claim 1 wherein the diethylene triamine is initially at a temperature of about 75° C. and (A) is added at a temperature of about 45 to about 75° C. in step (e).

3. The method of claim 2 wherein (A) and diethylene triamine are allowed to react while maintaining the mixture at a temperature less than about 75° C. in step (f).

4. The method of claim 1 wherein (A) and diethylene triamine are allowed to react while maintaining the mixture at a temperature less than about 75° C. in step (f).

5. The method of claim 1 wherein the means for controlling the shape of the encapsulant is an aluminum mold.

6. The method of claim 5 wherein the means for cooling the mixture of step (h) during cure is providing the aluminum mold with a solid mass volume at least ten times the volume of the encapsulant.

7. The method of claim 5 wherein the means for cooling the mixture comprises providing an air flow at 20–30° C. across the outer surface of the aluminum mold.

8. The method of claim 1 wherein up to about 15% by weight lower alkyl glycidyl ether is added to 100 to 85% by weight (A) before mixture with diethylene triamine in step (e).

9. The method of claim 1 wherein about 0.1 part by weight n-butyl glycidyl ether is added to about 0.9 part (A) and one part of this mixture is added to one part diethylene triamine in step (e).

10. A body compatible, implantable encapsulant prepared by the method of claim 1.

References Cited

UNITED STATES PATENTS

| | | | |
|---|---|---|---|
| 3,029,286 | 4/1962 | Bressler et al. ---- | 260—47 EN |
| 3,393,171 | 7/1968 | Vogt et al. -------- | 260—47 EN |
| 3,417,678 | 12/1968 | Ewers ----------- | 260—47 EN |
| 3,530,095 | 9/1970 | Porret ----------- | 260—47 EN |

WILLIAM E. KAMM, Primary Examiner

U.S. Cl. X.R.

128—419 P